Nov. 10, 1936.                H. STARGARDT                 2,060,386
                      MEASURING DEVICE FOR CONTAINERS
                           Filed Sept. 12, 1935
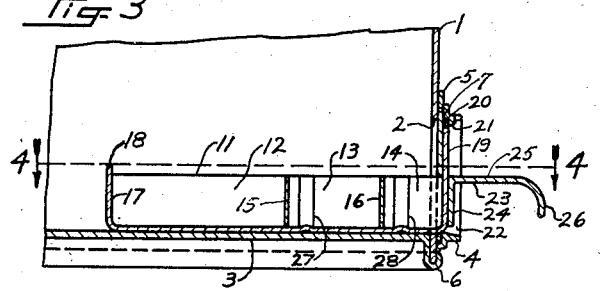
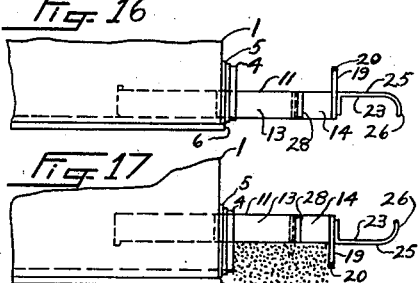
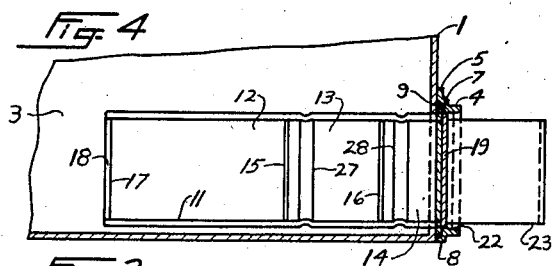
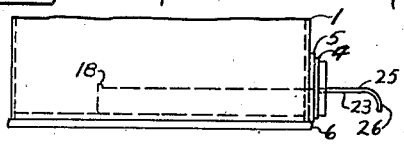
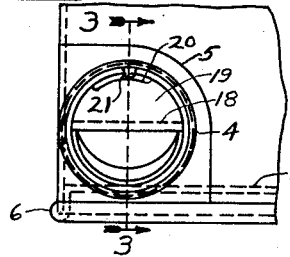
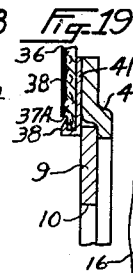
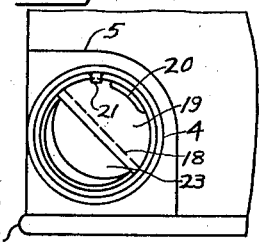
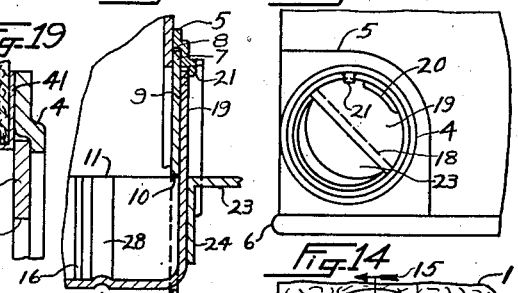
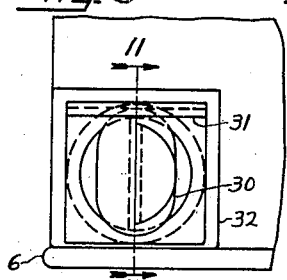
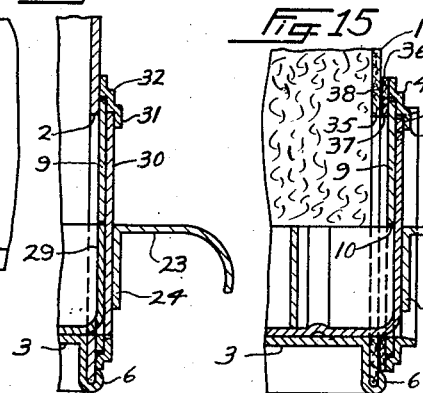
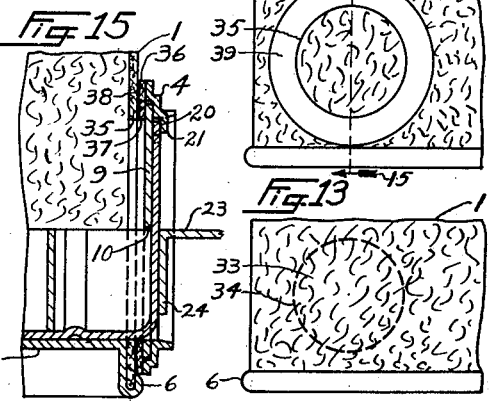
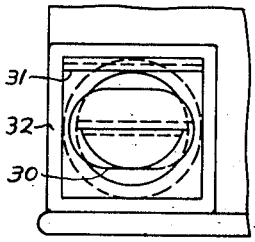
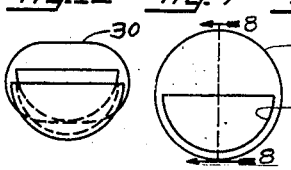
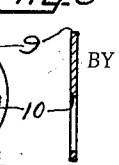
INVENTOR.
Helen Stargardt
BY George B. Ingersoll
ATTORNEY.

Patented Nov. 10, 1936

2,060,386

UNITED STATES PATENT OFFICE 2,060,386

MEASURING DEVICE FOR CONTAINERS

Helen Stargardt, Detroit, Mich.

Application September 12, 1935, Serial No. 40,219

21 Claims. (Cl. 221—105)

My invention relates to improvements in measuring devices for measuring the contents of containers, and the objects of my invention are, first, to provide a measuring device for containers which can be adjustably positioned to measure different quantities as desired in cooking operations; second, to provide a measuring device for a container and which can be emptied without tilting or turning the container; third, to provide a measuring device which is rotatably mounted in a container; fourth, to provide a rotatably mounted measuring device with means for leveling off the contents thereof to insure correct measured quantities; fifth, to provide a measuring device which can be readily applied to containers as an auxiliary unit; sixth, to provide a measuring device which is adapted to be readily applied to a container in which an opening has been cut or perforated therein; and seventh, to provide a measuring device with means for forming an opening in a container for receiving a measuring device installed with the container as an auxiliary mechanism.

Similar numerals refer to similar parts throughout the several views in which:—

Figure 1 is a partial side view of a container equipped with my measuring device; Fig. 2, a partial side view of a container disclosing the end of the measuring mechanism; Fig. 3, a partial sectional view of a container equipped with my measuring device, said sectional view being taken on the line 3—3, Fig. 2; Fig. 4, a partial sectional view of a container disclosing my measuring device, said partial sectional view being taken on the line 4—4, Fig. 3; Fig. 5, a partial sectional view of the measuring device taken on the line 3—3, Fig. 2, said partial sectional view being drawn to a larger scale than that disclosed in Fig. 2; Fig. 6, a partial side view of a container equipped with my measuring device and disclosing the measuring mechanism partially revolved relative to its position as disclosed in Fig. 2; Fig. 7, a side view of a disc member which is rotatably mounted and supports the measuring member; Fig. 8, a section of the disc member disclosed in Fig. 7 and taken on the line 8—8, Fig. 7; Fig. 9, a partial side view of a container equipped with an alternate design of my measuring device and disclosing the measuring member in a locked position therein; Fig. 10, a partial side view of the container equipped with the measuring mechanism disclosed in Fig. 9 and disclosing the measuring member in a position unlocked from the rest of the measuring mechanism and ready for removal from the measuring mechanism of the container; Fig. 11, a sectional view of the measuring mechanism disclosed in Figs. 9 and 10, said sectional view being drawn to a larger scale than that of Figs. 9 and 10; Fig. 12, an end view of the measuring member used in the measuring mechanism as disclosed in Figs. 9 and 10, said measuring member being removed from the measuring mechanism of the container; Fig. 13, a partial side view of a container made from cardboard or similar material and having a perforated portion adapted for ready removal to permit the installation of my measuring mechanism when used as an auxiliary unit; Fig. 14, a side view of the container disclosed in Fig. 15 and disclosing the opening as having been made therein by the removal of the perforated section, together with a line indicating the position of the attaching portion of the measuring mechanism when used as an auxiliary unit; Fig. 15, a partial sectional view of the container disclosing my measuring mechanism and utilized as an auxiliary unit attached thereto, said partial sectional view being taken on a line 15—15, Fig. 14; Fig. 16, a partial view of a container with the measuring member partially withdrawn therefrom; Fig. 17, a partial view of a container equipped with my measuring mechanism and disclosing the measuring member as being withdrawn from the container to a measuring position in which the measuring member has been rotated to an upside down position for ejecting or pouring the measuring contents therefrom into a receptacle; Fig. 18, a partial sectional view of the measuring device equipped with cutter portions for forming an opening in a container; and Fig. 19, a partial sectional view of the measuring device equipped with portions utilized for securing an attaching member thereto.

Similar numerals refer to similar parts throughout the several views.

The container 1 is provided with an opening 2 through one of its side walls and is preferably located adjacent one of the lower corners of the container 1.

The container 1 is further provided with the lower or bottom wall 3 which is suitably connected to the side wall portions of the container as by extending or lapping the edge portions of the bottom wall portion 3, as at 6, to extend therearound to obtain a closed and secure construction.

In the design of measuring mechanism as disclosed in Figs. 1, 2, 3, and 4, the member 4 is provided with the flange 5 which will be secured to the outer surface of one of the side walls of the container as by welding, soldering or similar means, the member 4 being provided with the depressed surface 7, which, together with the outer surface of the side walls of the container member with which the member 4 is used, forms the chamber 8 in which is rotatably mounted the disc 9, the disc 9 being provided with the semi-cylindrical opening 10 therethrough, the semi-cylindrical opening 10 being in alignment with the opening 2 and substantially of the same diameter to provide a suitable bearing for the measuring member or container 11 which is of semi-cylindrical shape and adapted to slidably move through and be supported in the semi-cylindrical opening 10 and have a shape and cross section substantially equal to one half of the cylindrical opening 2, the cylindrical opening 10 in the disc 9 and the cylindrical opening in the wall 1, forming a bearing for the measuring member or container 11 as it is slidably moved in and out of the container 1 and through the disc 9.

The measuring member 11 is provided with a suitable number of compartments of desired size, the measuring member 11 in Figs. 3 and 4 being disclosed as being provided with the compartment 12 which may be of sufficient size to correspond to the cubic contents of a teaspoon or tablespoon or similar measuring member as used in households for cooking operations, the measuring member 11 being further provided with the compartment 13 which may be of suitable size to be substantially equal to the cubic contents of a half teaspoon or tablespoon as desired, the measuring member 11 being further disclosed as being provided with the compartment 14 which may be of suitable size to be substantially equal to the cubic contents of a quarter teaspoon or tablespoon as desired, it being understood that the compartments 12, 13, and 14 may be provided with any suitable number of any desired size to render my measuring device adaptable for any measuring operations.

The measuring compartments 12, 13, and 14 are separated by the walls or partitions 15 and 16, the compartment 12 having the end wall 17, the upper edge 18 of which extends slightly above the upper edges of the measuring member 11 to permit the measuring member 11 to be moved outwardly until the upper edge 18 engages the inner surface of the disc 9 to limit the outward movement of the member 11.

The measuring member 11 is further provided with the end wall 19 at its outer end which is provided with a plurality of cam portions or surfaces 20 which are adapted to engage the cam lugs or projections 21 which are formed in the member 4 when the measuring member 11 is rotated from its position as disclosed in Fig. 6 to the position as disclosed in Fig. 2, the cam lugs 21 of the member 4 engaging the cam portion or surface 20 of the end wall 19, and thus wedging and locking the measuring member 11 in the container 1 and preventing the measuring member 11 from being accidentally turned or loosened and thus preventing movement of the measuring member 11 out of the container 1 except as desired by the operator in the measuring operation.

The end wall member 19 is formed with a cylindrical shape to permit its peripheral portions to be provided with the cam portions 20 to extend within the opening 22, the end wall 19 being locked in a position adjacent the outer surface of the disc 9 when in its innermost or locked position in the container 1.

The handle member 23 is formed with the flange portion 24 which is suitably secured to the outer surface of the wall 19 of the measuring member 11 as by soldering, welding or similar means, the handle member 23 being provided with the flange portion 25 extending horizontally and provided with the curved finger portion 26 at its outer end.

It is to be noted that the measuring member 11 is provided with the corrugated or ribbed portions 27 and 28 which extend therearound and are located adjacent and at one side of the partition or wall portions 15 and 16, the corrugated or ribbed portions 27 and 28 being formed to be readily discernible on the outer or underside of the measuring member 11 so that when the measuring member 11 is pulled outwardly from the container 1 as disclosed in Fig. 16, the corrugated or ribbed portions 27 and 28 will be readily discernible on the outside of the measuring member 11 and can be located substantially flush with the outer side of the disc 9, thus indicating to the operator that the smaller compartments 13 and 14 of the measuring member 11 are properly placed or positioned so that with a rotatable movement of the measuring member 11, the proper measured amount will be selected and ejected from the compartments 13 and 14 of the measuring member 11.

It is to be noted that the opening 2 in the side wall portion of the container 1 will be located as close as practical to the corner of the container 1 so that substantially all of the contents of the container 1 may be eventually worked into the measuring member 11 for measuring purposes, thus providing means whereby substantially all of the contents of the container 1 can be utilized without leaving wasteful amounts of the contents of the container 1 therein.

Figs. 9, 10, 11, and 12 disclose a modified locking mechanism for retaining the measuring member 11 in the container when not in use for measuring purposes and in this modified design the container 1 is provided with the opening 2 together with the disc 9, the measuring member 11 however being provided with the outer end wall 29 which extends substantially to the center or axis of the measuring member 11 and is provided with the oblong or elongated disc 30, the ends of which are adapted to be positioned under and engaging the overhanging lip or flange 31 of the member 32 which is suitably secured to the outer wall of the container 1 as by soldering, welding or similar means, and is adapted to rotatably support the disc 9 in a similar way to the mechanism disclosed in Figs. 2, 3, 4, and 5, which thus allows the measuring member to be rotated by the handle member 23 so that one of the ends of the elongated disc 30 may be positioned under and in engagement with the flange 31 to lock the measuring member 11 in its innermost position, as disclosed in Figs. 9 and 11 and also permits the measuring member 11 to be located so that the end of the elongated disc 11 may be moved out from under and in engagement with the member or flange 31 to permit the measuring member 11 to be slidably moved outwardly in a similar manner to that of the mechanism disclosed in Figs. 1, 2, 3, and 4.

Also where containers are made from pasteboard, cardboard or similar material as disclosed in Fig. 15, means are disclosed whereby my measuring device may be applied to such packages as an auxiliary unit. It is to be noted that such pasteboard, cardboard, or similar containers may be provided, if desired, by the manufacturer with a portion 33 as disclosed in Fig. 13, which may be partially cut through as around the perforated line 34, thus enabling the portion 33 to be easily removed by pressing on same to provide the opening 35 as disclosed in Fig. 14 through one of the wall portions of the container 1 to enable the measuring device to be inserted therethrough and attached to the outside of the container 1.

In this way my measuring device may be sold as an auxiliary unit for application by the householder to various packages containing contents such as salt, sugar, baking powder or similar materials and which are necessarily needed to be measured in their use in cooking operations.

In the mechanism as shown in Fig. 15 the disc 36 will be provided with the hole 37 which is adapted to be aligned with the hole 35 through a side wall portion of the container 1, the disc 36 being suitably secured to the member 4, thus providing for the rotatable mounting of the disc 9 between the member 4 and the disc 36 in a similar way to that disclosed in the other mechanisms disclosed herein, but with the difference that the disc member 36 and the member 4 will provide a unit which may be mounted in alignment with the opening 35 in the side wall portion of the container 1 by means of the disc 36 which is preferably made of cardboard, pasteboard or similar material, the inner surface of the disc member 36 being provided with a layer 38 of mucilage, glue or similar material, which by wetting or moistening will render it readily adhesive to the outer surface of the wall portion of the container 1 to which the mechanism is to be secured.

The layer 38 of the disc member 36 thus contacts and fastens to the wall portion of the container 1 around the area as indicated at 39 in Fig. 14.

Also where it is not desired to form the container 1 with the perforated and circular line 34 to permit a portion of the wall to be forced thereoutof to provide an outlet of the contents from the container 1, the disc 41 may be suitably secured to the member 4 as disclosed in Fig. 18, the disc 41 being provided with a series of teeth portions 42 provided with cutting edges and extending at right angles to the main surface of the disc portion 41 and which are adapted to be inserted through the wall of the container 1 and with the rotation of the member 4, the cutting edges of the teeth portions 42 cutting the opening 35 in the container 1, where said container 1 is made of pasteboard, cardboard or similar material, and where this mechanism is used to form the opening 35, the disc 36 will be provided with the recess 37A extending therearound which will enable the teeth portions 42 to be bent over at their outer ends at 38 to secure the disc member 36 in place in association with the disc member 41 and the member 4, as disclosed in Fig. 19, the teeth portions 42 being made of such lengths and of material as will enable their end portions to be bent around to secure the disc portion 36 in position, after which the assembly constituting the disc members 36 and 41, and the member 4, together with the disc 9 rotatably mounted therein, and the measuring member 11, may be secured to the outer surface of the wall portion of the container adjacent the opening 35 by means of the layer 38 of glue, mucilage or other material, as disclosed in Fig. 19.

In operation if the measuring device is to be applied to a container made of pasteboard, cardboard or similar material, and is of the designs as disclosed in Figs. 18 and 19, the member 4, together with the disc 41, will be pressed against the outer surface of a wall portion of the container 1 and by pressure thereagainst the teeth members 42 will pierce the outer portions of the wall of the container 1. Then by rotation the cutting edges of the teeth members 42 will cut through a portion of the wall of the container 1 and form the opening 35, after which the teeth portions 42 will be bent over as disclosed at 38 to lock and secure the disc member 36 adjacent the disc member 41, then the member 4, together with the disc member 41 and the disc member 36 may be secured to the outer portion of the wall surface by moistening the outer surface of the layer 38 of glue and pressing it against the outer surface of the wall portion of the container 1 until it is secured thereto.

Of course if the manufacturer decides to build the measuring device directly into the container 1 as an integral part thereof, and especially will this be true where the container 1 is constructed of metal or similar material, the member 4 will be initially secured to the container 1 as by soldering, welding or by similar means in the manufacture of the initial unit and manufacturing operations for making the container 1.

Then the measuring member 11 will be inserted through the opening 10 of the disc 9 from one side so that the handle portion 23 will extend on the outside of the container 1 and with the measuring member 11 inserted in the container 1, as disclosed in Fig. 3, the contents of the container 1 will tend to fall into and fill the compartments 12, 13, and 14.

This is very easily accomplished by shaking the container 1 so that its contents tend to fall toward the bottom corners of the container 1. With the compartments 12, 13, 14, and 15 filled, the measuring member 11 is withdrawn as disclosed in Figs. 16 and 17 to a desired distance in which one of the rib members 27 and 28 lie adjacent the outer surface of the disc member 9 to provide one half or one quarter teaspoon or tablespoonful of the contents of the container as desired and in accordance with the cubic contents of the compartments 12, 13, 14, and 15, the corrugated portions being readily discernible as they reach and extend through the opening 10 so that by positioning one of the rib portions 27 and 28 adjacent the outer surface of the disc 9. the portion of the measuring member 11 extending beyond said ribs 27 and 28 is indicated as containing the required measured amount or amounts.

Also the measuring member 11 may be withdrawn until its rear end wall portion 18 contacts with the inside surface of the disc 9 in which case the total cubic contents of the compartments 12, 13, and 14 may be utilized with their total cubic capacity for a desired measured amount of the contents of the container 1.

After the measuring member 11 has been withdrawn to the required distance in accordance with the contents in the container to be measured, then the measuring member 11 is rotated, together with the disc 9, through substantially one half a revolution which will place the open side of the compartments 12, 13 or 14 downward and which readily allows the contents thereof to be poured or dropped thereoutof and into a suitable receptacle, such as 44, Fig. 17, used in the cooking operation.

Fig. 17 further discloses the measuring member 11 in its inverted position in which the contents thereof are indicated at 43 as being ejected or deposited into the cooking container 44.

After the measuring operation has been completed and the contents poured, dropped or ejected therefrom, then the measuring member 11 is again rotated in a reverse direction through substantially one half revolution, after which the measuring member may be located in its inner position and located therein by means of the cam lugs 21 of the member 4 and the cam members or surface 20 on the end wall portion 19, or by moving one end of the elongated disc 30 under the overhanging ledge 31 as disclosed.

I claim:

1. In a measuring device for a container, the combination of a wall portion of said container provided with an opening therethrough, a member provided with an opening in alignment with the opening of said wall portion, said member having a flange secured to said wall portion, said member forming a chamber between it and said wall portion, said member being further provided with cam lugs, a disk rotatably mounted in said chamber between said wall portion and said member and provided with a semi-cylindrical opening therethrough, and a measuring member provided with a plurality of compartments having end wall portions, said measuring member being provided with corrugations adjacent a portion of said end wall portions, said measuring member being provided with a stop portion for engaging said disk to limit outward movement of said measuring member, said measuring member being further provided with a handle member together with cam surfaces for engaging said cam lugs of said member, said measuring member being slidably mounted in said disk and adapted for rotation in said member and said container.

2. In a measuring device for a container, the combination of a support member rotatably mounted and a measuring member mounted in said support member to move axially thereof, and means for locking said measuring member against movement.

3. In a measuring device for a container, the combination of a member mounted on a wall of the container and providing a chamber therebetween, a disk rotatably mounted in said chamber, and a measuring member movably mounted in said disk and extending within the container.

4. In a measuring device for a container, the combination of a wall portion having an opening therethrough, a member secured to said wall portion and having an opening, said member having a depressed surface adjacent said wall portion and forming a chamber therewith, a disk rotatably mounted in said chamber and provided with a semi-cylindrical opening therethrough, a measuring member having compartments and extending through said semi-cylindrical opening of said disk and through said openings of said wall portion and said member into said container, and means for retaining said measuring member in the container.

5. In a measuring device for a container, the combination of a measuring member having a semi-cylindrical shape and provided with a plurality of measured compartments, said measuring member being adapted to move longitudinally, and means for rotatably supporting said measuring member, said means being located solely adjacent the outside surface of a wall portion of the container to permit substantially the total contents of the container to be measured by said measuring member.

6. In a measuring device for a container, the combination of a housing member provided with fixed locking portions, and a measuring device movably mounted in said housing member and provided with compartments having end walls, one of said end walls having locking portions adapted to engage said locking portions of said housing member.

7. In a measuring device for a container, the combination of a disk rotatably mounted, a housing member secured to said container and supporting said disk, said housing member being provided with locking portions, and a measuring container movably mounted in said disk and provided with a wall portion for engaging said disk to limit movement of said measuring container, said measuring container having a second wall portion provided with locking portions adapted to engage said locking portions of said housing member to retain said measuring container in the container.

8. In a measuring device for a container, the combination of a disk rotatably mounted, and a measuring member slidably mounted in said disk and provided with compartments, said measuring member being further provided with corrugated portions for location adjacent said disk to indicate the amount of slidable movement of said measuring member necessary for a desired measurement.

9. In a measuring device for a container, the combination of a measuring member provided with compartments having open sides, means for moving said measuring member longitudinally to position its inner end wall substantially in longitudinal alignment with a main side wall portion of the container, and means for rotating said measuring member to an upside down position to place said open sides of said compartments at the bottom of said measuring member, said means comprising a rotatable support for said measuring member.

10. In a measuring device for a container, the combination of a disk rotatably mounted and provided with a semi-cylindrical opening therethrough, and a measuring member slidably mounted in said semi-cylindrical opening of said disk and having compartments having a semi-cylindrical shape conforming to said semi-cylindrical opening of said disk to permit said measuring member to be moved longitudinally through said disk, said disk levelling off the contents of said compartments of said measuring member flush with the upper surfaces of said compartments.

11. In a measuring device for a container, the combination of a measuring member provided with compartments together with end walls extended above the upper effective surfaces of said compartments, and a disk rotatably mounted and supporting said measuring member, said disk being adapted to be engaged by said end walls of said measuring member to limit the movement of said measuring member in opposite directions.

12. In a measuring device for a container, the combination of a member secured to said container, a disk rotatably supported between said member and said container, and a measuring member movably supported in said disk and provided with an elongated flange having ends adapted to engage edge portion of said member to retain said measuring member in the container.

13. In a measuring device for a container, the combination of a wall portion of the container provided with an opening, a housing member having a flange secured to said wall portion around said opening thereof, a disk member rotatably mounted between said wall portion and said flange, a measuring member mounted in said disk member to move axially thereof, and means for retaining said measuring member in said housing member.

14. In a measuring device for a container, the combination of a measuring mechanism rotatably mounted and extending within the container, and means for enabling said measuring mechanism to be installed as an auxiliary unit on said container, said means being provided with a flange portion adapted for securement to a wall portion of the container.

15. In a measuring device for a container, the combination of a wall portion of the container provided with perforations to permit a portion of the wall to be entirely severed from the remaining wall portion to form a sole opening therethrough, and a measuring mechanism adapted to be secured to said wall portion adjacent said opening and extending through said sole opening into said container, said measuring mechanism comprising a rotatably mounted support for the measuring member thereof.

16. In a measuring device for a container, the combination of a measuring mechanism, means supported on said measuring mechanism for entirely severing a portion of a wall of said container to form an opening in said container, and means for securing said measuring mechanism to said container, adjacent the opening formed by severing said portion of said wall of the container.

17. In a measuring device for a container, the combination of a housing structure provided with teeth members having cutting edges, a disk rotatably mounted in said housing structure, said housing structure together with said disk being adapted to be rotated to cut an opening in said container, means for securing said housing structure to said container, and a measuring member movably supported in said disk.

18. In a measuring device for a container, the combination of a housing member, a disk secured to said housing member and provided with teeth portions having cutting edges adapted to cut an opening in said container, said teeth portions being adapted to be bent over to secure a disk, a second disk secured to said first mentioned disk and said housing member by said teeth portions of said first mentioned disk, means for securing said second disk to said container, a third disk rotatably mounted between said housing member and said first mentioned disk, and a measuring member movably mounted in said third disk and said housing member.

19. In a measuring device for a container, the combination of a fibrous member, means for causing said fibrous member to adhere to said container, a housing supported by said fibrous member, a disk rotatably mounted between said fibrous member and said housing, a measuring member provided with compartments and movably supported by said disk, and means for securing said measuring member to said housing.

20. In a measuring device for containers, the combination of a disc revolvably mounted on the container and provided with semi-circular opening therethrough, and a semi-circular shaped member provided with measuring compartments and slidably mounted in and adapted to be rotated with said disc, said semi-circular shaped member extending within the container and adapted to be moved longitudinally to and fro relative to the container.

21. In a measuring device for a container, the combination of a member revolvably mounted in the container, and a measuring member movably mounted in and prevented from turning relative to said first mentioned member, said measuring member being adapted to receive contents from the container and to deliver said contents outside of the container.

HELEN STARGARDT.